(12) United States Patent
Suzuki

(10) Patent No.: US 7,060,145 B2
(45) Date of Patent: Jun. 13, 2006

(54) METHOD OF MAKING PNEUMATIC TIRE

(75) Inventor: Kazuya Suzuki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 188 days.

(21) Appl. No.: 10/327,878

(22) Filed: Dec. 26, 2002

(65) Prior Publication Data

US 2003/0121592 A1    Jul. 3, 2003

(30) Foreign Application Priority Data

Dec. 28, 2001  (JP) .............................. 2001-400269

(51) Int. Cl.
*B29D 30/36*    (2006.01)

(52) U.S. Cl. .................... 156/126; 156/130; 156/130.3

(58) Field of Classification Search ................ 156/126, 156/127, 130, 130.3, 133, 408, 405.1, 421
See application file for complete search history.

(56) References Cited

U.S. PATENT DOCUMENTS

| | | | |
|---|---|---|---|
| 2,422,652 A * | 6/1947 | Bacon, Jr. .................... 156/130 |
| 3,138,510 A * | 6/1964 | Hindin et al. ................ 156/367 |
| 3,746,597 A * | 7/1973 | Appleby et al. ............ 156/396 |
| 3,944,458 A | 3/1976 | Branick |
| 4,243,451 A * | 1/1981 | Kortman ...................... 156/132 |
| 4,276,105 A | 6/1981 | Gessaga |
| 5,032,198 A * | 7/1991 | Kojima et al. ............... 156/117 |
| 5,413,653 A * | 5/1995 | Kondo et al. ................ 156/111 |
| 5,975,179 A | 11/1999 | Kelly, Jr. |

FOREIGN PATENT DOCUMENTS

| | | |
|---|---|---|
| DE | 19823433 C1 | 6/1999 |
| GB | 1147134 A | 4/1969 |

\* cited by examiner

*Primary Examiner*—Geoffrey L. Knable
(74) *Attorney, Agent, or Firm*—Birch, Stewart, Kolasch & Birch, LLP

(57) ABSTRACT

In a method of making a pneumatic tire which comprises a tire main body and a tread rubber with axial edges, the inside diameter of the tread rubber being smaller at the axial edges than in the intermediate portion, the tire main body including an underlying component on which the axial edge of the tread rubber is stuck, the green tire is made by: making a raw tire main body including an underlying component; placing an annular raw tread rubber around the raw tire main body; swelling the raw tire main body by pressurizing the inside thereof; pushing the entire width of the raw tread rubber onto the swollen tire main body partially with respect to the tire circumferential direction; and conducting the circumferentially-partial pushing through the enter circumference of the raw tread rubber, whereby the axial edge of the raw tread rubber is stuck on the underlying component without being wrinkled.

6 Claims, 6 Drawing Sheets

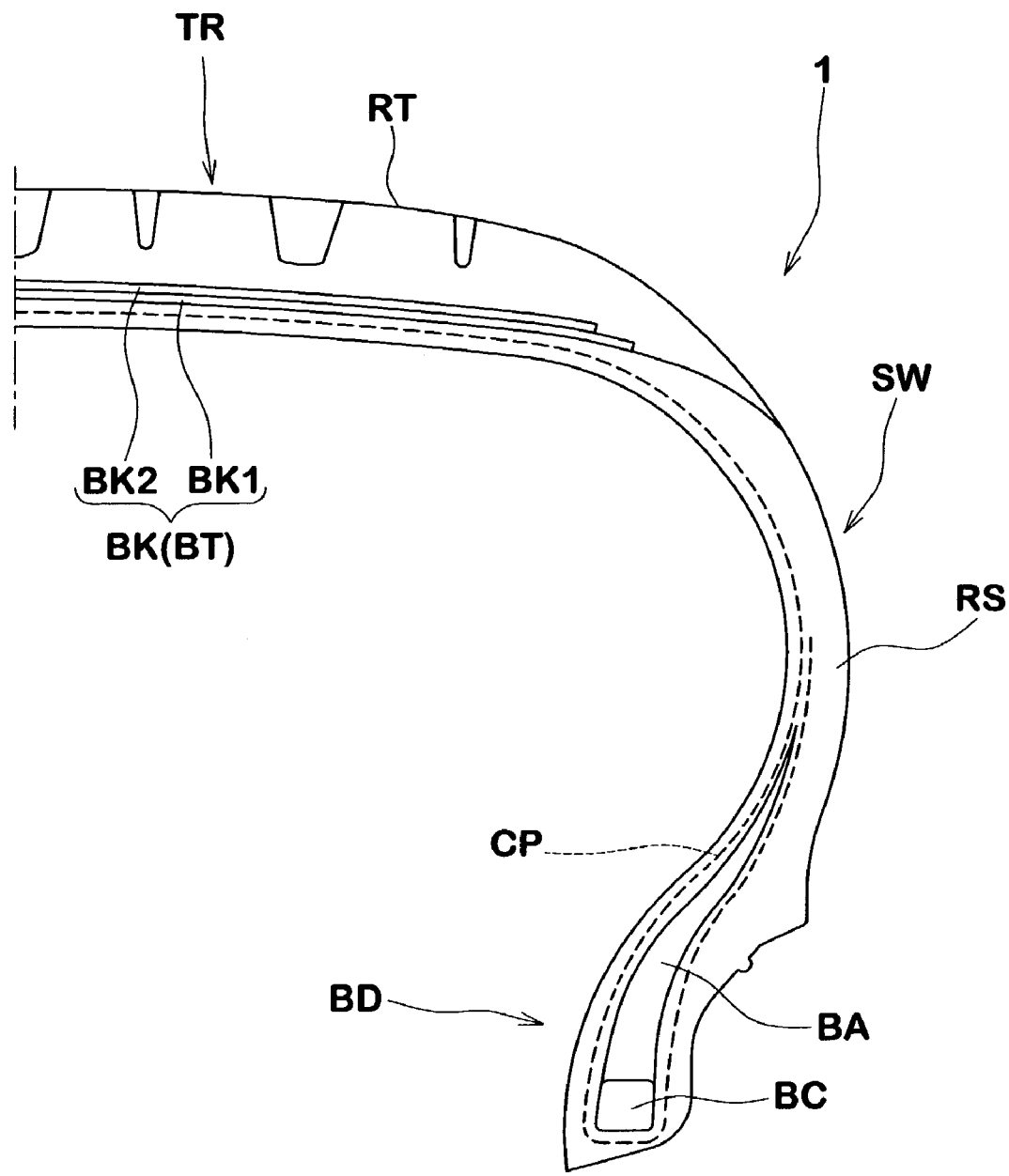

METHOD OF MAKING PNEUMATIC TIRE

BACKGROUND OF THE INVENTION

The present invention relates to a method of making a pneumatic tire, more particularly to a process of sticking the tread rubber edge on the underlying tire component.

In general, a pneumatic tire is provided with a tread reinforcing belt BT as shown in FIG. 1, and a tread rubber RT is disposed radially outside the belt BT.

Recently, on the other hand, pneumatic tires having round shoulders are widely used in passenger cars and the like. In such a tire, accordingly, the difference between the diameter at the tread rubber edges and that in the center is more than a little. Therefore, during construction of a green tire, when the edge of the tread rubber RT is pushed down to stick it on the underlying tire component, the edge is very likely wrinkled as shown in FIG. 6. As a result, the uniformity of the finished tire such as RFV and RRO is liable to deteriorate.

SUMMARY OF THE INVENTION

It is therefore, an object of the present invention to provide a method of making a pneumatic tire, by which the edge of the tread rubber can be stuck on the underlying tire component without being wrinkled and thus the tire uniformity can be improved.

Thus, the method according to the present invention targets at such a pneumatic tire that comprises a tire main body and a tread rubber with axial edges, the inside diameter of the tread rubber being smaller at the axial edges than in the intermediate portion therebetween, the tire main body including underlying components on which the axial edges of the tread rubber are stuck.

According to the present invention, a method of making a pneumatic tire comprising making a green tire and vulcanizing the green tire, wherein the making of the green tire comprises making a raw tire main body including an underlying component, placing an annular raw tread rubber around the raw tire main body, swelling the raw tire main body by pressurizing the inside thereof, pushing the entire width of the raw tread rubber onto the swollen tire main body partially with respect to the tire circumferential direction, conducting the circumferentially-partial pushing through the enter circumference of the raw tread rubber.

Therefore, the axial edge of the raw tread rubber is stuck on the underlying component.

BRIEF DESCRIPTION OF THE DRAWINGS

An embodiment of the present invention will now be described in detail in conjunction with the accompanying drawings.

FIG. 1 is a cross sectional view of a pneumatic tire.

DETAILED DESCRIPTION OF THE INVENTION

Figure 2A:
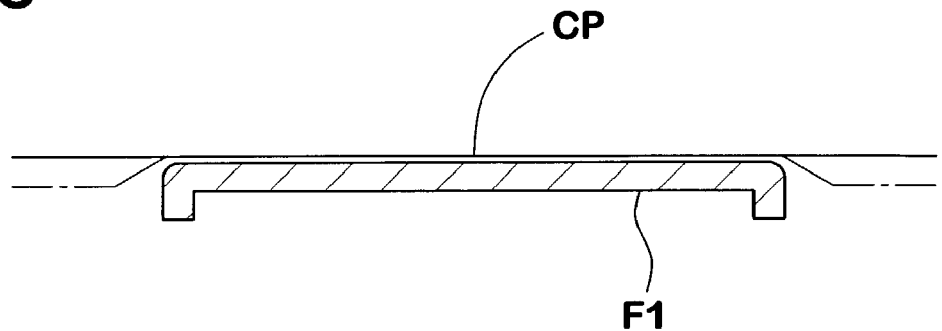
FIG. 2a is a schematic sectional view for explaining a process of applying a carcass ply to a tire building drum.

In FIG. 1 showing an exemplary pneumatic tire 1 which can be made by the method according to the present invention, the tire 1 comprises a tread portion TR, a pair of sidewall portions SW, a pair of bead portions BD each with a bead core BC therein, at least one carcass ply CP extending between the bead portions BD, a belt BT disposed radially outside the crown portion of the carcass ply CP, and various rubber components. The rubber components include a tread rubber RT disposed radially outside the belt BT, a sidewall rubber RS disposed axially outside the carcass ply CP in each sidewall portion Sw, a bead rubber disposed along the surface of the bead portion BD, a bead apex rubber BA disposed radially outside the bead core BC in each bead portion BD, and optionally an air-impermeable inner liner rubber disposed along the inner surface of the tire and so on.

The belt BT comprises a breaker BK and optionally a band. The band is composed of at least one cord whose cord angle is less than about 10 degrees with respect to the tire equator. The breaker BK is composed of at least one ply of parallel cords whose cord angle is more than about 15 degrees with respect to the tire equator. In this example, the belt BT consists of a breaker BK made up of two cross plies BK1 and BK2.

According to the present invention, an annular raw tread rubber TR is placed around a tire main body B including an underlying tire component on which the edge of the tread rubber TR is stuck. The tire main body B is swollen by pressurizing the inside thereof. The entirety of the tread rubber TR (namely, not only the edge portions but also the intermediate portion) is pushed in partially with respect to the tire circumferential direction towards the swollen tire main body. The circumferentially-partial pushing-in is made through the enter circumference.

Therefore, the tread rubber edge is first stuck on the underlying tire component. Then, as the tread rubber Rt is freed from the circumferentially-partial pushing-in force, the tread rubber and tire main body return to their equilibrium state while pulling in the tread rubber edge. As a result, the tread rubber edge can be stuck on the underlying tire component without being wrinkled.

In case of the tire structure shown in FIG. 1, the underlying tire component is the sidewall rubber SW because the tapered radially outer edge of the sidewall rubber SW is extended to the belt edge along the radially inner surface of the tread rubber edge. In case the tapered radially outer edge of the sidewall rubber SW is placed radially outside the tread rubber edge, the underlying tire component may be the carcass ply CP or another cord layer or another rubber layer.

The following is an example of the method of making a pneumatic tire according to the present invention, wherein the tire main body B is first made into a substantially cylindrical shape by using a tire building drum F1, and then the tire main body B is swollen by using a former F2, and a tread assembly D is made using a belt drum (not shown).

As shown in FIG. 2a, a carcass ply CP is applied to a substantially cylindrical face of the tire building drum F1. The bead rubber and an air-impermeable inner liner rubber if required are also applied to the building drum surface in advance.

Figure 2B:
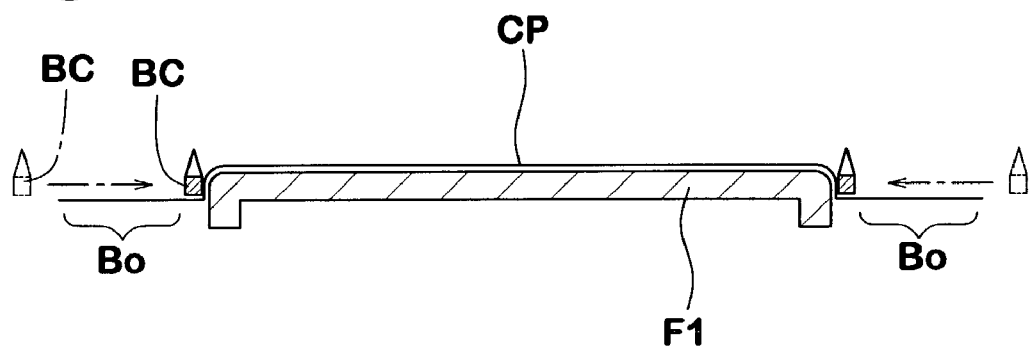
FIG. 2b is a schematic sectional view for explaining a process of setting bead cores.
Figure 2C:
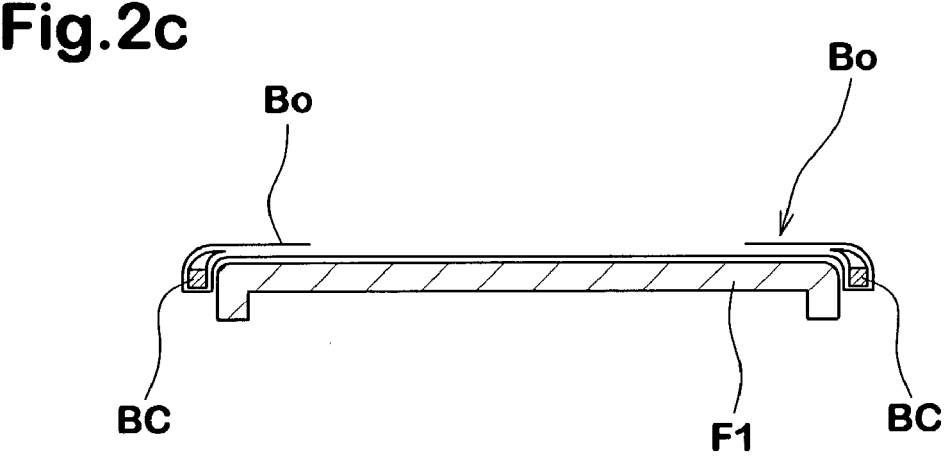
FIG. 2c is a schematic sectional view for explaining a process of turning up the carcass ply edges.

As shown in FIG. 2b, the annular bead core BC made of a wound wire and the bead apex rubber BA on the outside thereof are set around the carcass ply CP at a predetermined distance from each of the carcass ply edges. And both of the edge portions Bo of the carcass ply CP are turned up around the bead cores BC as shown in FIG. 2b. The sidewall rubber and the like may be further applied to the carcass ply CP at this stage. Thus, the substantially cylindrical tire main body B is made.

Next, the main body B is placed on the former F2 for swelling.

Figure 3:
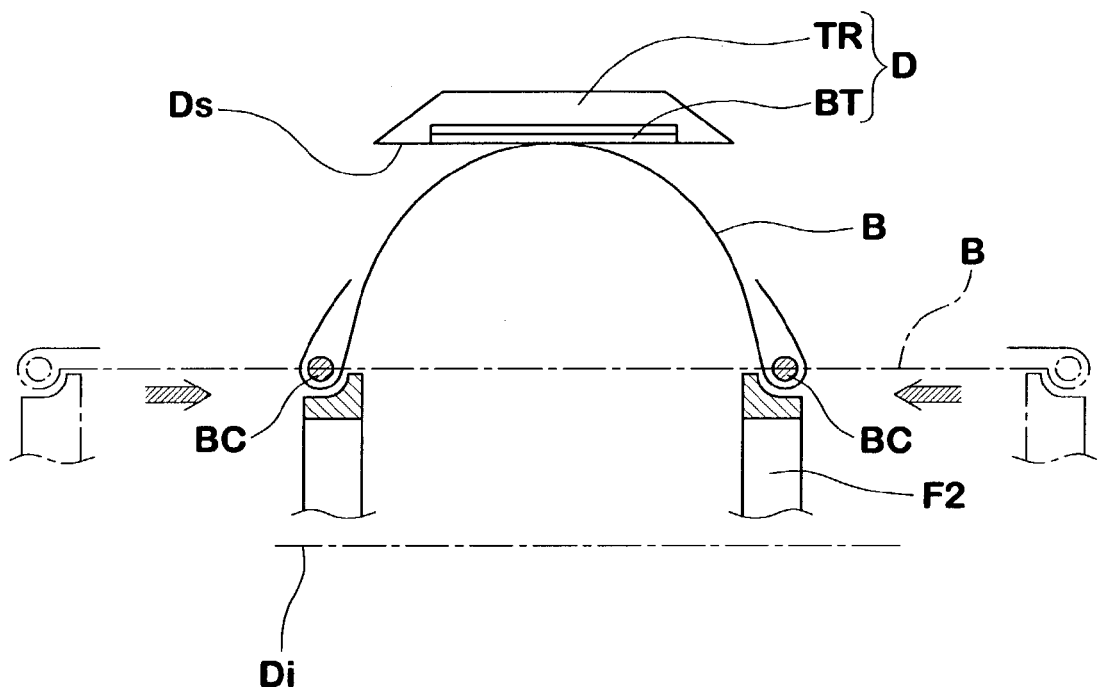
FIG. 3 is a schematic sectional view for explaining a process of swelling a tire main body and setting a tread assembly.

As shown in FIG. 3, the tread assembly D is set around the main body B, and as the distance between the bead cores BC is decreased, the cylindrical tire main body B is swollen into a toroidal shape.

The tread assembly D comprises the belt BT (in this example the breaker BK only) and the tread rubber RT on the radially outside thereof. The inner surface DS of the tread assembly D has a predetermined profile such as slightly curved line and straight line in a cross section including the axis Di. The cross sectional shape is substantially trapezoidal. The tread assembly D in this example is made by winding the breaker ply BK1 on a profiled face of the belt drum, winding the breaker ply BK2 thereon and winding the tread rubber RT on the breaker plies.

In order to swell the tire main body B, a relatively low pressure is applied to the inside of the tire main body B using an inflatable tube or the like. The pressure is more than 40 kPa preferably more than 50 kPa but less than 100 kPa preferably 80 kPa.

Figure 4A:
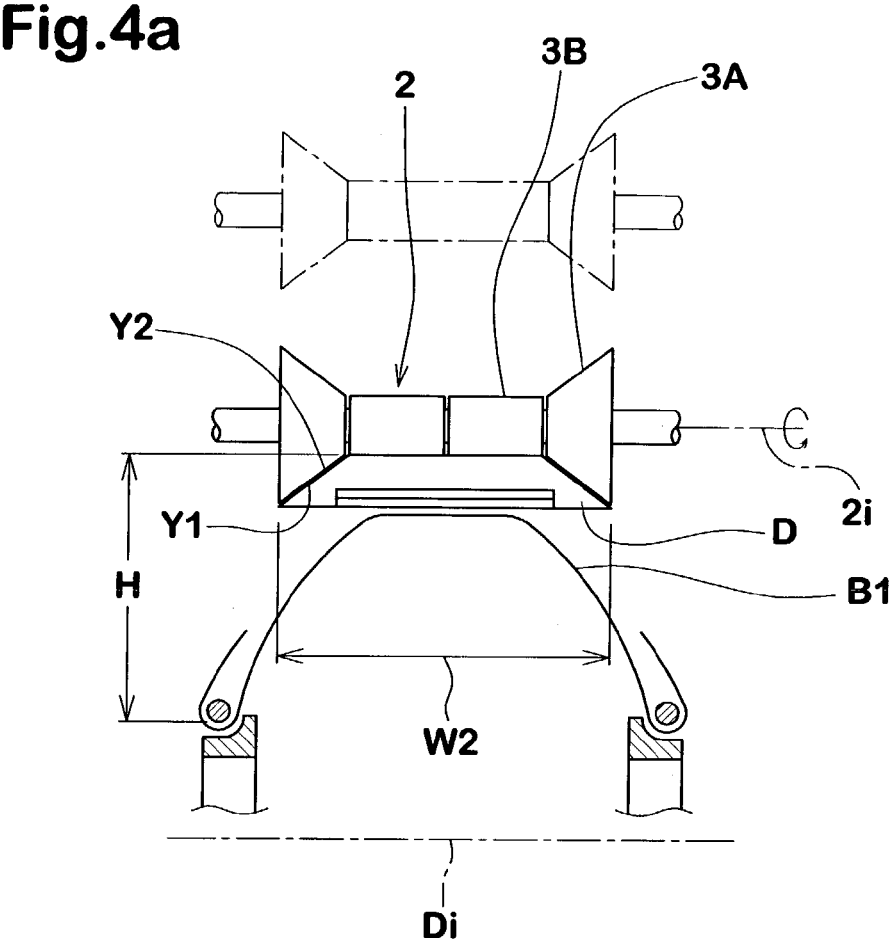
FIG. 4a is a schematic sectional view showing a state of the tire main body which is fully swollen.
Figure 4B:
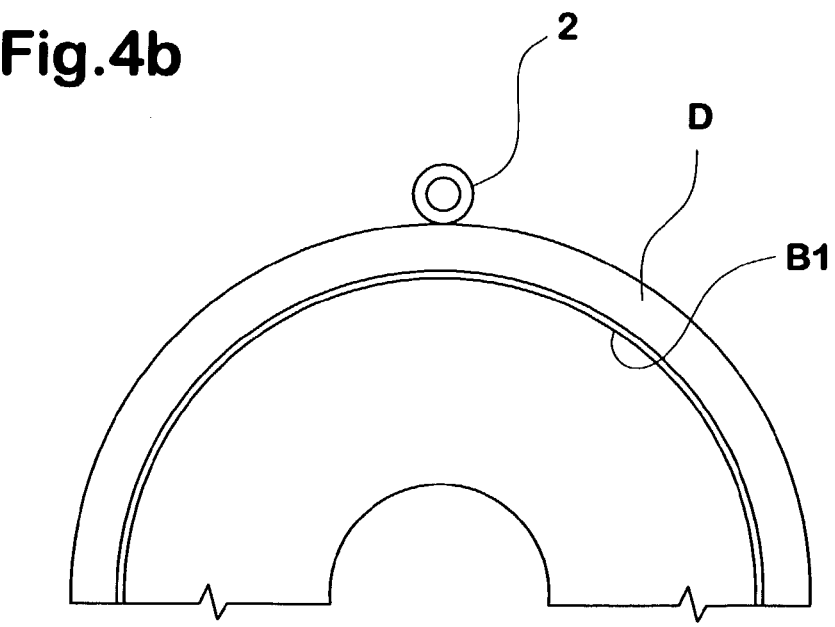
FIG. 4b is a schematic side view showing the same state.

It is desirable that, under such a low pressure, as shown in FIGS. 4a and 4b, the crown of the swollen part B1 presses the central part of the inner surface of the tread assembly D in view of the prevention of belt cord disarrangement.

If the pressure is less than 40 kPa, the pressing becomes insufficient and the shape of the swollen part B1 becomes unstable and tire uniformity deteriorates. If the pressure is more than 100 kPa, it becomes difficult to carry out the undermentioned pushing-in adequately.

Figure 5A:
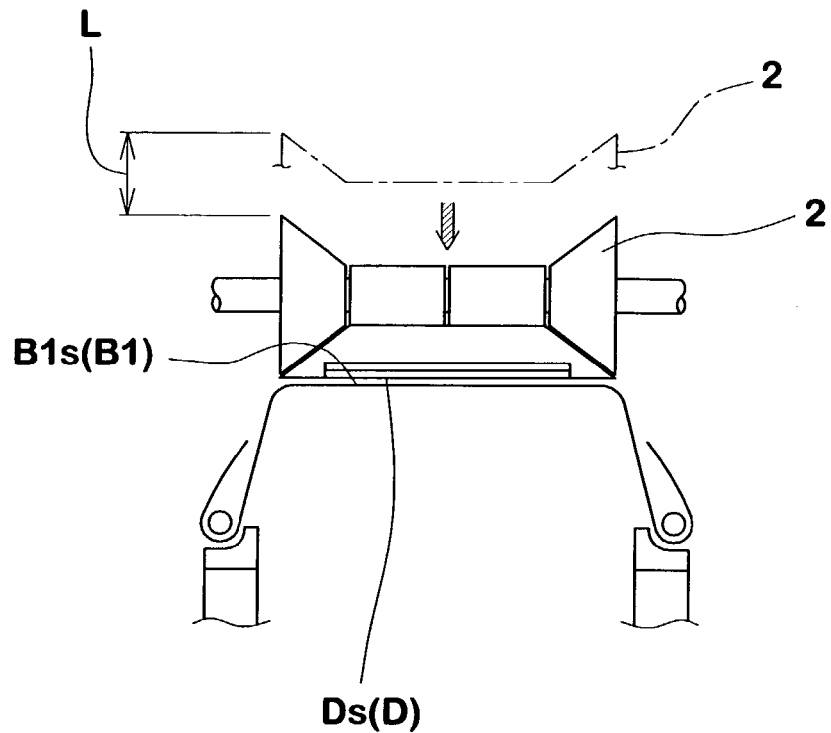
FIG. 5a is a schematic sectional view showing a state of a presser roller which is in its sticking position.
Figure 5B:
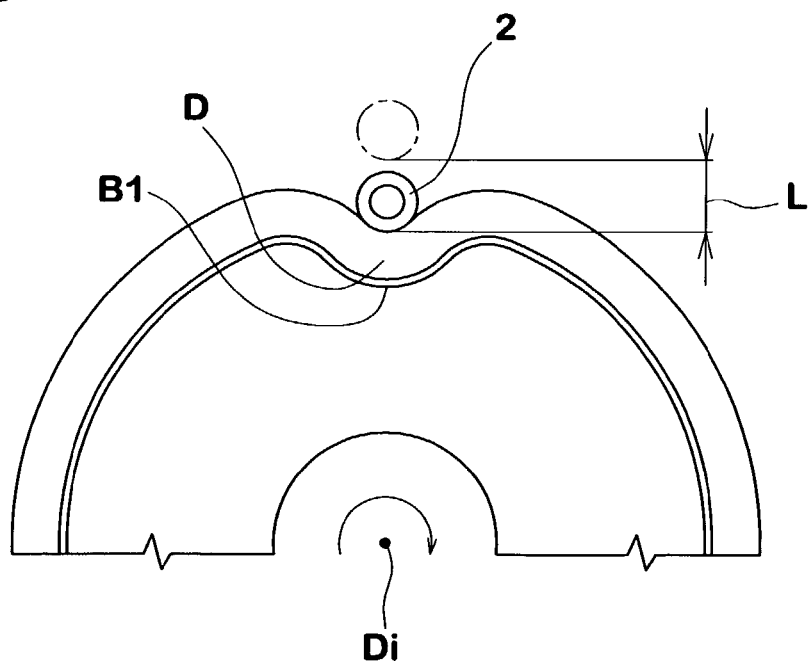
FIG. 5b is a schematic side view showing the same state.
Figure 6:
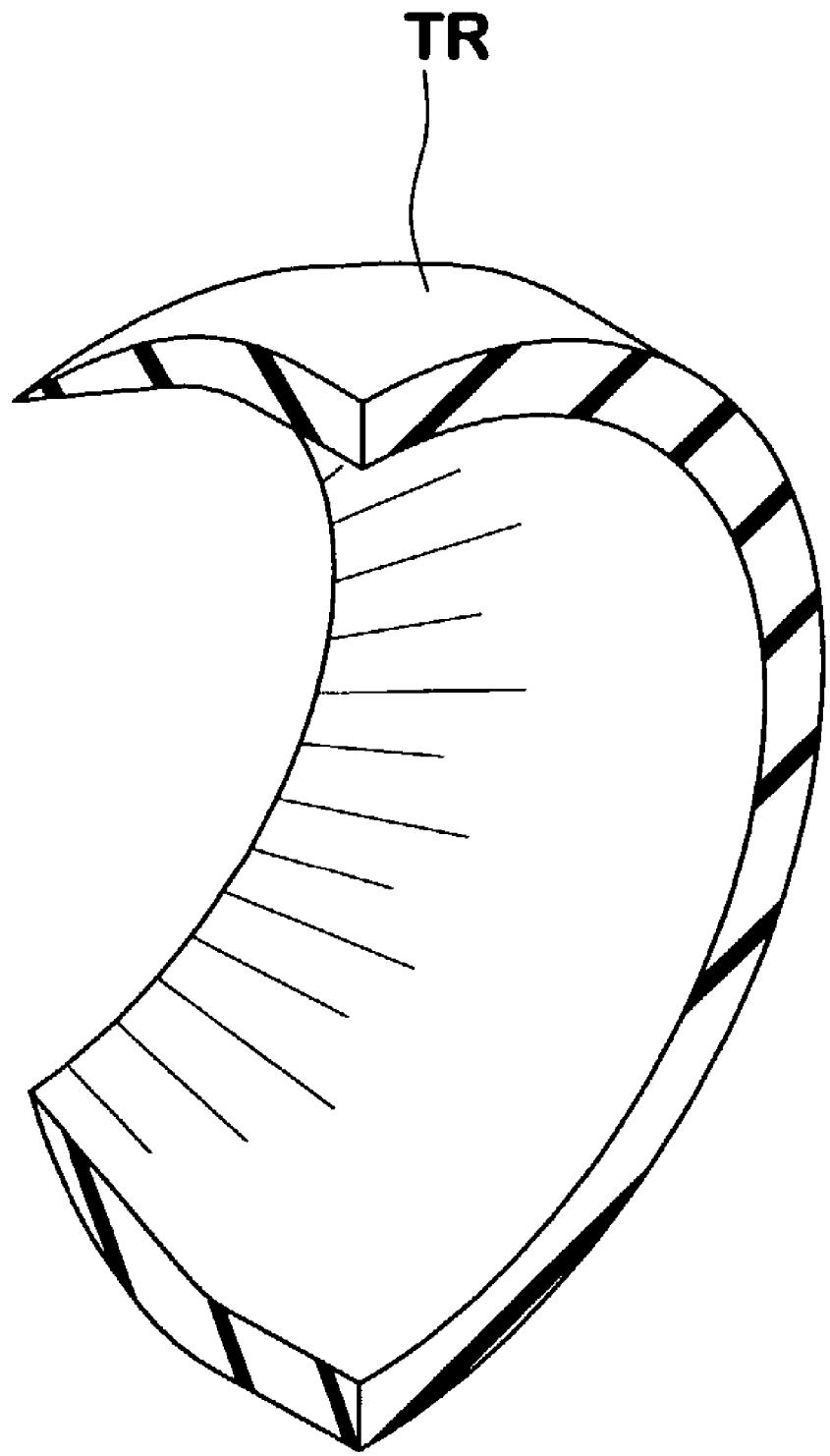
FIG. 6 is a schematic perspective view of a tread rubber for explaining the problem when the tread rubber edges are pushed down.

In order that the tread assembly D is stuck on the swollen part B1 through the overall width thereof, as shown in FIGS. 5a and 5b, the inner surface DS of the tread assembly D is pressed onto the outer surface B1s of the swollen part B1 by using a presser roller 2.

The presser roller 2 has the rotation axis 2i being parallel with the axis Di of the tread assembly D and the roller 2 is relatively movable towards the axis Di to a sticking position, and also relatively movable around the tread assembly D while keeping the sticking position. In order to relatively move around the tread assembly D, in this example, the tread assembly D is rotated together with the tire main body B by the former F2. But it is also possible to move the presser roller 2 only or together.

The part W2 of the presser roller 2 contacting with the tread assembly D has a profile Y1 which is the substantially same as the profile Y2 of the tread assembly D in the cross section including the axis 2i, Di. Therefore, the roller 2 is provided with a cylindrical central portion 3B having a substantially constant diameter, and a pair of truncated circular cone portions 3A disposed one on each side of the central portion 3B and tapering towards the center to a diameter corresponding to that of the central portion 3B.

The roller 2 can be formed as a single piece, but it is preferable that the roller 2 is made up of a plurality of discrete parts so as to be able to deal with different tire sizes by appropriately replacing the parts with another parts and thereby to restrict the number of the parts. In this example, the roller 2 is collectively formed of four parts which are two central rollers defining the central portion 3B and two outer rollers defining the cone portions 3A.

The above-mentioned sticking position is such that the presser roller 2 pushes in the swollen part B1 as well as the tread assembly D as shown in FIG. 5b.

Therefore, beneath the presser roller 2 at the sticking position, the swollen part B1 changes its sectional shape as being almost straight and closely contacts with the inner surface Ds of the tread assembly D through the overall width of the inner surface Ds. As a result, they are adhered to each other by their adhesiveness.

It may be preferable that the amount L of the pushing-in in the tire radial direction is set in a range of from 5 to 35%, more preferably 15 to 25% of the radial height H between the radially outer face of the tread assembly D and the radially inner face of the bead core BC which corresponds to the section height of the green tire.

If the pushing-in amount L is less than 5%, it becomes difficult to stick the tread assembly D on the swollen part B1 through the overall width of the inner surface Ds. If the pushing-in amount L is more than 35%, the inner pressure of the tire main body is greatly increased by the pushing-in, and the swollen part B1 is deformed to disturb the arrangement of the carcass cords and the like and the tire uniformity is liable to deteriorate.

The green tire made is put in a tire mold and vulcanized as usual.

Comparison Test

As explained above in connection with FIGS. 2, 3, 4 and 5, green tires were made under several conditions by changing the swelling pressure and amount of pushing-in in order to compare the time required to stick the tread assembly on the tire main body. And in order to compare uniformity of the finished tires, the green tires were vulcanized. The results are shown in Table 1.

The uniformity test was conducted according to JASO-c607 (Test method for automobile tire uniformity), and the radial force variation (RFV) was measured under a tire pressure of 200 kPa and a tire load of 600 kgf. In Table 1, the mean value for a hundred tires is shown, wherein the smaller the value, the better the tire uniformity.

TABLE 1

|  | Ex. 1 | Ex. 2 | Ex. 3 | Ex. 4 | Ref. 1 | Ref. 2 |
| --- | --- | --- | --- | --- | --- | --- |
| Inner pressure (kPa) | 70 | 70 | 70 | 70 | 30 | 120 |
| Pushing-in L (mm) | 25 | 25 | 25 | 25 | 25 | 25 |
| L/H | 0.25 | 0.25 | 0.25 | 0.25 | 0.25 | 0.25 |
| Presser roller |  |  |  |  |  |  |
| Max. diameter (mm) | 80 | 100 | 120 | 140 | 80 | 80 |
| Pressure (kPa) | 200 | 200 | 200 | 200 | 200 | 200 |
| Test result |  |  |  |  |  |  |
| Sticking time (sec.) | 10 | 10 | 10 | 10 | 10 | 10 |
| RFV (N) | 59 | 54 | 54 | 54 | — | — |
| Sticking (*1) | ok | ok | ok | ok | x1 | x2 |

(*1) x1: The breaker could not completely adhere to the carcass ply and the green tire could not be made.
x2: The tread rubber edges could not be fully stuck on the underlying component.

In the above-explained embodiment, the tire building drum F1 and the former F2 are described as being separate machines. But, according to the present invention, it is of course possible that each is a part of one machine. with respect to the carcass structure, the present invention can be applied to various tires, but it is suitably applied to radial tires. The number of carcass ply may be plural. Again the band may be of a single wide ply extending across the substantially overall width the breaker, or axially spaced edge plies covering the breaker edges, or the combination of such a wide ply and edge plies.

The invention claimed is:

1. A method of making a pneumatic tire, the pneumatic tire comprising a tire main body and a tread rubber with axial edges, the inside diameter of the tread rubber being smaller at the axial edges than in the intermediate portion therebetween, the tire main body including an underlying component on which the axial edge of the tread rubber is stuck, the method comprising making a green tire and vulcanizing the green tire, the making of the green tire comprising making an assembly of an annular raw tread rubber and a tread reinforcing belt, making a raw tire main body including an underlying component, placing the assembly of the annular raw tread rubber and the belt around the raw tire main body, swelling the raw tire main body by pressurizing the inside thereof so that a crown of a swollen part thereof presses a central part of the inner surface of the assembly, pushing the entire width of the raw tread rubber onto the swollen tire main body partially with respect to the tire circumferential direction by relatively moving a presser roller toward the swollen part to a sticking position, the sticking position being such that the presser roller pushes the swollen part together with the assembly so that beneath the presser roller the swollen part changes its shape and the overall width of the inner surface of the assembly closely contacts with the tire main body, whereby the axial edges of the tread rubber adhere to the underlying component, wherein a part of the presser roller contacting with the assembly has a profile which is substantially the same as a profile of the assembly, and conducting the circumferentially-partial pushing through the entire circumference of the raw tread rubber by relatively moving the presser roller around the assembly while maintaining the sticking position, whereby the axial edge of the raw tread rubber is stuck on the underlying component.

2. A method according to claim 1, wherein the swollen tire main body has an inner pressure of more than 40 kPa.

3. A method according to claim 1, wherein the swollen tire main body has an inner pressure of less than 100 kPa.

4. A method according to claim 1, wherein the amount of the pushing against the raw tread rubber in the tire radial direction is in a range of from 5 to 35% of the section height of the green tire.

5. A method according to claim 1, wherein the making of the assembly comprises: winding a breaker ply on a profiled face of a belt drum; winding a breaker ply thereon; and winding a strip of the tread rubber on the breaker plies.

6. A method according to claim 5, wherein the inner surface of the assembly is, in its cross section, a slightly convexly curved line or alternatively a straight line.

* * * * *